(12) United States Patent
Toshine et al.

(10) Patent No.: US 6,994,937 B2
(45) Date of Patent: Feb. 7, 2006

(54) HOLOGRAM TRANSFER FOIL (75) Inventors: Tetsuya Toshine, Tokyo (JP); Hiroyuki Ohtaki, Tokyo (JP); Kenji Ueda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 108 days.

(21) Appl. No.: 09/843,891

(22) Filed: Apr. 30, 2001

(65) Prior Publication Data

US 2001/0046630 A1 Nov. 29, 2001

(30) Foreign Application Priority Data

| Apr. 28, 2000 | (JP) | ............................. 2000-130609 |
| Apr. 28, 2000 | (JP) | ............................. 2000-131254 |
| Aug. 14, 2000 | (JP) | ............................. 2000-245581 |
| Mar. 26, 2001 | (JP) | ............................. 2001-086936 |

(51) Int. Cl.
*G03H 1/04* (2006.01)

(52) U.S. Cl. ................... 430/1; 430/2; 283/81; 283/86; 359/2; 359/3

(58) Field of Classification Search ................... 430/1, 430/2; 283/81, 86; 359/2, 3
See application file for complete search history.

(56) References Cited

U.S. PATENT DOCUMENTS

| 4,856,857 A | * | 8/1989 | Takeuchi et al. ............... 283/86 |
| 4,908,285 A | * | 3/1990 | Kushibiki et al. .............. 430/1 |
| 5,066,047 A | * | 11/1991 | Mailloux et al. ............. 283/86 |
| 5,066,525 A | * | 11/1991 | Nakamachi et al. ........... 430/1 |
| 5,341,230 A | * | 8/1994 | Smith ........................... 359/13 |
| 5,470,662 A | * | 11/1995 | Weber et al. .................. 430/1 |

(Continued)

FOREIGN PATENT DOCUMENTS

| CA | 2046711 | * | 1/1992 |
| EP | 521296 | * | 1/1993 |

(Continued)

*Primary Examiner*—Martin J. Angebranndt
(74) *Attorney, Agent, or Firm*—Sughrue Mion, PLLC (57) ABSTRACT

The invention provides a hologram transfer foil (1) comprising, that includes, in order from top to bottom, a substrate (7), a volume hologram layer (2) releasably stacked on substrate (7) and comprising a volume hologram in a cured resin layer, a first heat seal layer (3) and a second heat seal layer (4). In use, the hologram transfer foil (1) is applied on the second heat seal layer (4) side over an application member. The adhesion force of volume hologram layer (2) to the application member is larger than a material fracture force for the volume hologram layer or the application member, so that the hologram transfer layer can be applied by thermo-compression to the application member. This hologram transfer foil is useful for illegal copying of the hologram layer because when the volume hologram is forcibly peeled from the application, a material fracture of the volume hologram layer or application member occurs. When a colored layer functioning as a back layer is provided, it is possible to obtain a hologram transfer foil which eliminates any adverse influence of a coloring component on the volume hologram layer.

11 Claims, 2 Drawing Sheets

U.S. PATENT DOCUMENTS

| | | | |
|---|---|---|---|
| 5,731,060 A * | 3/1998 | Hirukawa et al. | 428/195 |
| 5,843,598 A * | 12/1998 | Ueda et al. | 430/1 |
| 6,022,440 A * | 2/2000 | Nordeen et al. | 156/241 |
| 6,066,378 A * | 5/2000 | Morii et al. | 283/66 |
| 6,081,354 A * | 6/2000 | Gambogi et al. | 359/15 |
| 6,127,066 A * | 10/2000 | Ueda et al. | 430/1 |
| 6,482,489 B1 * | 11/2002 | Otaki et al. | 428/40.1 |
| 6,852,397 B2 * | 2/2005 | Toshine et al. | 428/212 |
| 2002/0015897 A1 * | 2/2002 | Toshine et al. | 430/2 |

FOREIGN PATENT DOCUMENTS

| | | | |
|---|---|---|---|
| JP | 61-238079 | * 10/1986 | 430/1 |
| JP | 63-284587 | * 11/1988 | 359/3 |
| JP | 63-287988 | * 11/1988 | 430/2 |

* cited by examiner

HOLOGRAM TRANSFER FOIL

BACKGROUND OF THE INVENTION

The present invention relates to a hologram transfer foil for enabling a volume hologram to be applied to any associated member by thermo-compression as well as to a hologram transfer foil useful for prevention of illegal copying of the volume hologram after applied to the associated member.

A volume hologram provides a means capable of recording information in its thickness direction, and recording and reconstructing three-dimensional images. Volume holograms are now fabricated by known fabrication processes. Typically, the volume holograms are used for prevention of illegal copying of ID cards, bank cards, etc., because they are fabricated by precise operations using optical equipment and so are very difficult to fake. In addition, the volume holograms are expressed in interference colors of light and so have an outside appearance hardly achievable by other imaging means. In a typical application taking full advantage of the aforesaid features of volume holograms, a hologram adhesive label, obtained in a film form with an adhesive attached thereto, is applied to a variety of associated members. For instance, JP-A 63-284586 discloses a transfer type hologram of a multilayer structure comprising a substrate, a volume hologram layer and a heat seal layer in this order. In view of prevention of illegal copying using a relief hologram, for instance, Japanese Patent No. 2,934,281 shows a transfer type hologram of a multilayer structure comprising a substrate, a relief hologram layer and a heat seal layer in this order.

In the former, however, the volume hologram layer is basically made up of a photo-cured resin layer whereas the associated member is formed of high-quality paper or the like. Such a material difference often makes it difficult to select a heat-sealing agent showing satisfactory adhesion with respect to both materials, and so this label is applied to only a limited number of application members although depending on the heat sealing agent used. For this reason, the hologram layer peels off at an interface between the volume hologram layer and the heat seal layer or the heat seal layer and the application member, resulting in a high risk of illegal copying.

The latter transfer type hologram has a feature of seeing through characters, images or the like on the application member due to a difference between the volume hologram and the relief hologram. If a colored layer is interleaved between the volume hologram layer and the application member to form a back layer, the contrast of a hologram image can then be enhanced so that high visibility is achievable. However, it is difficult to color the volume hologram per se and so the provision of another colored layer is now under investigation. For instance, the applicant has already filed patent applications Nos. 10-278493 and 11-324980 to come up with the use of a colored adhesive layer. However, the migration of a coloring component into the volume hologram layer becomes a problem because of an adverse influence on hologram recording.

One object of the present invention is to provide a hologram transfer foil enabling a volume hologram to be applied to any desired application member by thermo-compression, which is effective for prevention of illegal copying because the volume hologram layer or the associated member suffers a material breakdown upon the hologram layer being forcibly released after application. Another object of the present invention is to provide a hologram transfer foil capable of ensuring prevention of an adverse influence on the hologram layer of a coloring component in a colored layer functioning as a back layer.

SUMMARY OF THE INVENTION

According to the first aspect of the present invention, there is provided a hologram transfer foil characterized by comprising, in order from top to bottom, a substrate, a volume hologram layer which is releasably stacked on said substrate and comprises a volume hologram in a cured resin layer (hereinafter called simply a volume hologram layer), a first heat seal layer and a second heat seal layer.

According to the second aspect of the present invention, there is provided a hologram transfer foil characterized by comprising, in order from top to bottom, a substrate, a surface protective layer which is releasably stacked on said substrate (hereinafter called a releasable protective layer), a volume hologram layer comprising a volume hologram in a cured resin layer, a first heat seal layer and a second heat seal layer.

The hologram transfer foil of the present invention is characterized in that in use, the hologram transfer foil is applied on the second heat seal layer side over an application member, and the adhesive force of the volume hologram layer to the application member is larger than the material fracture force for the volume hologram layer or the application member.

The hologram transfer foil of the present invention is characterized in that the aforesaid first heat seal layer is a transparent, aqueous heat seal layer and the aforesaid second heat seal layer is a colored heat seal layer.

The hologram transfer foil of the present invention is characterized in that the aforesaid colored second heat seal layer is a multilayer structure comprising a colored layer and a second heat seal layer in order from the first heat seal layer.

The hologram transfer foil of the present invention is characterized in that the aforesaid colored layer is a colored layer-forming ink layer.

The hologram transfer foil of the present invention is characterized in that the aforesaid colored layer is a layer comprising a metal or a metal oxide.

The hologram transfer foil of the present invention is characterized in that it is laminated on a release sheet on the surface of the second heat seal layer.

The present invention provides a hologram transfer foil wherein a volume hologram is applicable to any desired application member by thermo-compression. Even when the volume hologram is forcibly peeled from the application member for faking purposes, a material fracture of the volume hologram layer or application member occurs, thereby making any illegal copying of the volume hologram impossible. The present invention also provides a colored hologram transfer foil which ensures to obtain a hologram image of enhanced contrast and can surely eliminate any adverse influence of a coloring component on the volume hologram layer.

DESCRIPTION OF THE PREFERRED EMBODIMENTS

Figure 1:
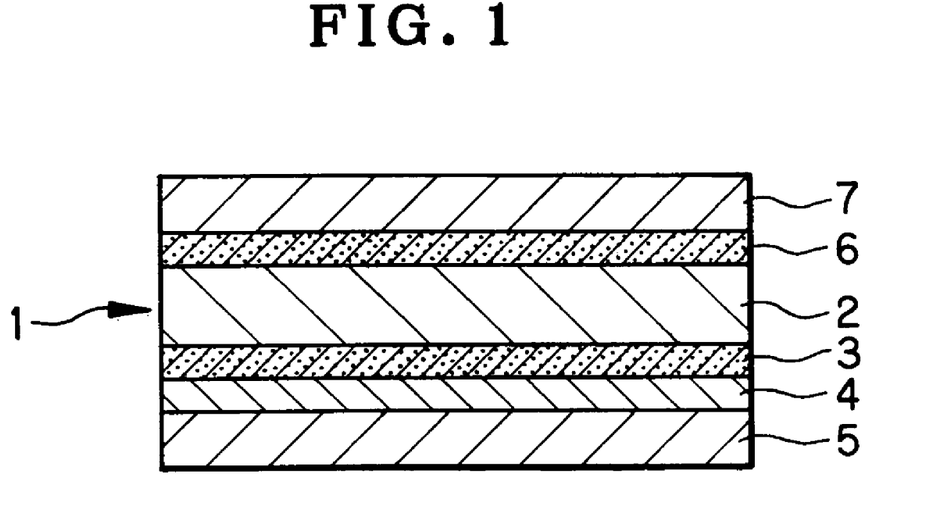
FIG. 1 is a sectional view illustrative of one embodiment of the hologram transfer foil of the invention.

A section of one embodiment of the hologram transfer foil of the present invention is shown in FIG. 1 wherein 1 represents a hologram transfer foil, 2 a volume hologram layer, 3 a first heat seal layer, 4 a second heat seal layer which is or is not colored, 5 a releasable sheet, 6 a releasable protective layer and 7 a substrate.

The volume hologram layer 2 is a photosensitive material layer in which light of interference between object light and reference light is recorded so that the three-dimensional structure of an object is recorded as such, said layer having a thickness much larger than the spacing between interference fringes. This volume hologram layer 2 is formed by recording light of interference between object light and reference light directly in a volume hologram-forming material stacked on a support film or subjecting an original hologram in close contact with the hologram-forming material to exposure to light. The latter process is used for industrial purposes.

The support film on which the volume hologram-forming material is to be coated, for instance, includes polyethylene terephthalate films (usually called PET films), polyethylene films, polypropylene films, polyvinyl chloride films, acrylic films, triacetyl cellulose films, and cellulose acetate butyrate films, all having a thickness of 1 μm to 1 mm, and preferably 10 μm to 100 μm. For the support film it is preferable to use a film of high transparency and high smoothness.

For the volume hologram-forming material, all known volume hologram recording materials such as silver-salt materials, dichromated gelatin emulsions, photo-polymerizable resins and photo-crosslinkable resins may be used. In consideration of production efficiency, however, it is preferable to use for the volume hologram-forming material a photosensitive material suitable for a dry volume phase type of hologram recording application, which comprises a matrix polymer, a photo-polymerizable compound, a photo-polymerization initiator and a sensitizing dye, if required, with a plasticizer and surfactant added thereto.

For the matrix polymer that is a binder resin, use may be made of copolymers (or a mixture thereof) comprising as a polymerization component or components at least one copolymerizable component selected from the group consisting of polymethacrylic acid ester or its partial hydrolysate, polyvinyl acetate or its hydrolysate, polyvinyl alcohol or its partially acetallized product, triacetyl cellulose, polyisoprene, polybutadiene, polychloroprene, silicone rubber, polystyrene, polyvinyl butyral, polyvinyl chloride, chlorinated polyethylene, chlorinated polypropylene, poly-Nvinylcarbazole or its derivative, poly-N-vinylpyrrolidone or its derivative, copolymer of styrene and maleic anhydride or its half ester, acrylic acid, acrylic acid ester, methacrylic acid, methacrylic acid ester, acrylamide, acrylnitrile, ethylene, propylene, vinyl chloride and vinyl acetate.

For the matrix polymer, it is more preferable to use polyisoprene, polybutadiene, polychloroprene, polyvinyl alcohol, polyvinyl acetal that is a partially acetallized product of polyvinyl alcohol, polyvinyl butyral, polyvinyl acetate, ethylene-vinyl acetate copolymer and vinyl chloride-vinyl acetate copolymer which may be used alone or in admixture.

The recorded hologram is stabilized by the step of migrating the monomers by heating. To this end, it is required that these matrix polymers have such a relatively low glass transition temperature as to make the migration of monomers smooth.

The photo-polymerizable compounds used herein, for instance, include photo-polymerizable, photo-linkable monomers, oligomers and prepolymers, each containing at least one ethylenical unsaturated bond per molecule as will be explained later, which may be used alone or in admixture. Exemplary compounds are unsaturated carboxylic acids or their salts, esters of unsaturated carboxylic acids and aliphatic polyvalent alcohol compounds, and amide combined products of unsaturated carboxylic acids and aliphatic polyvalent amine compounds.

Exemplary unsaturated carboxylic acid monomers are acrylic acid, methacrylic acid, itaconic acid, crotonic acid, isocrotonic acid and maleic acid as well as their halogen-substituted unsaturated carboxylic acids such as chlorinated unsaturated carboxylic acids, brominated unsaturated carboxylic acids and fluorinated unsaturated carboxylic acids. Examples of the salts of unsaturated carboxylic acids are sodium, potassium or like salts of the aforesaid acids.

The ester monomers of aliphatic polyvalent alcohol compounds and unsaturated carboxylic acids—which are the photo-polymerizable compounds used herein—may include those classified as acrylic acid esters, for instance, ethylene glycol diacrylate, triethylene glycol diacrylate, 1,3-butanediol diacrylate, tetramethylene glycol diacrylate, propylene glycol diacrylate, neopentyl glycol diacrylate, trimethylolprpane triacrylate, trimethylolpropane tri (acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri (acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate and o-biphenyl acrylate.

The ester monomers of aliphatic polyvalent alcohol compounds and unsaturated carboxylic acids—which are the photo-polymerizable compounds used herein—may include those classified as methacrylic acid esters, for instance, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacylate, pentaerythritol tetramethacrylate, dipentaerythritol dimethacrylate, dipentaerythritol hexamethacrylate, sorbitol trimethacrylate, sorbitol tetramethacrylate, bis-[p-3-methacryloxy-2-hydroxypropoxy) phenyl]dimethylmethane, bis-[p-(acryloxyethoxyphenyl] dimethylmethane, 2,2-bis(4-methacryloyloxyphenyl)propane, and mehacrylic acid-2-naphthyl.

The ester monomers of aliphatic polyvalent alcohol compounds and unsaturated carboxylic acids—which are the photo-polymerizable compounds used herein—may include those classified as crotonic acid esters, for instance, ethylene glycol isocrotonate, tetramethylene glycol dicrotonate, pentaerythritol dicrotonate, and sorbitol tetraocrotonate.

The ester monomers of aliphatic polyvalent alcohol compounds and unsaturated carboxylic acids—which are the photo-polymerizable compounds used herein—may include those classified as isocrotonic acid esters, for instance, ethylene glycol diisocrotonate, pentaerythritol diisocrotonate, and sorbitol tetraisocrotonate.

The ester monomers of aliphatic polyvalent alcohol compounds and unsaturated carboxylic acids—which are the photo-polymerizable compounds used herein—may include those classified as maleic acid esters, for instance, ethylene glycol dimaleate, triethylene glycol dimaleate, pentaerythritol dimaleate, and sorbitol tetramaleate.

The halogenated unsaturated carboxylic acids that are the photo-polymerizable compounds used herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, methacrylic acid-2,4,6-tribromophenyl, dibromoneopentyl dimethacrylate (available under the trade name of NK Ester DBN, Shi-Nakamura Chemical Industries, Ltd.), dibromopropyl acrylate (available under the trade name of NK Ester A-DBP, Shin-Nakamura Chemical Industries, Ltd.), dibromopropyl methacrylate (available under the trade name of NK Ester DBP, Shin-Nakamural Chemical Industries, Ltd.), methacrylic acid chloride, methacrylic acid-2,4,6-trichlorophenyl, pchlorostyrene, methyl-2-chloroacrylate, ethyl-2-chloroacrylate, n-butyl-2-chloroacrylate, tribromophenol acrylate, and tetrabromophenol acrylate.

The amides of unsaturated carboxylic acids and aliphatic polyvalent amine compounds—which are the photo-polymerizable compounds used herein—may include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, xylylenebismethacrylamide, N-phenylmethacrylamide, and diacetone acrylamide.

Besides, the photo-polymerizable compounds may include polyisocyanate compounds having two or more isocyanate groups per molecule, as described in JP-B 48-41708, vinylurethane compounds having two or more polymerizable vinyl groups per molecule, with the addition thereto of a hydroxyl groupcontaining vinyl monomer represented by $CH_2=C(R)COOCH_2CH(R')OH$ where R and R' each stand for a hydrogen atom or a methyl group), etc.

Urethane acrylates as set forth in JP-A 51-37193, and polyester acrylates, epoxy resins and polyfunctional acrylates or methacrylates such as (meth)acrylic acids as shown in JP-A 48-64183 and JP-B's 49-43191 and 52-30490, respectively, may also be used in the present invention.

In addition, compounds referred to as photo-curable monomers and oligomers in The Journal of Adhesion Society of Japan, Vol. 20, No. 7, pp. 33–308 may be used.

For the photo-polymerizable compounds used herein, use may further be made of phosphorus-containing compounds such as mono(2-acryloyloxyethyl) acid phosphate (available under the trade name of Light Ester Pa., Kyoeisha Oil & Fat Chemical Industries, Ltd.), mono(2-methacryloyloxyethyl) acid phosphate (available under the trade name of Light Ester PM, Kyoeisha Oil & Fat Chemical Industries, Ltd.), and epoxy acrylate compounds (available under the trade names of Ripoxy VR-60 and Ripoxy VR-90, Showa Polymer Co., Ltd.).

For the photo-polymerizable compounds used herein, use may further be made of commercial products available under the trade names of NK Ester M-230G and NK Ester 23G, Shin-Nakamura Chemical Industries, Ltd.).

Use may further be made of triacrylates having the following structural forulae and available under the trade names of Alonix M-315 and Alonix M-325, To a Synthesis Chemical Industries, Ltd.):

Use may further be made of 2,2'-bis(4-acryloxy.diethoxyphenyl)propane (available under the trade name of NK Ester A-BPE-4, Shin-Nakamura Chemical Industries, Ltd.), tetramethylolmethane tetraacrylate (available under the trade name of NK Ester A-TMMT, Shin-Nakamura Chemical Industries, Ltd.), etc.

For the photo-polymerization initiator in the initiator system, for instance, 1,3-di(t-butyldioxycarbonyl) benzophenone, 3,3', 4,4'-tetrakis (t-butyldioxycarbonyl) benzophenone, N-phenylglycine, 2,4,6-tris (trichloromethyl)-triazine, 3-phenyl-5-isooxazolone, 2-mercaptobenzimidazole, and imidazole dimers may be used. In view of the stabilization of the recorded hologram, the photo-polymerization initiator should preferably be removed by decomposition after hologram recording. For instance, organic peroxide initiators are preferred because of being easy to decompose by ultraviolet irradiation.

Exemplary senstizing dyes are those having absorption light at 350 to 600 nm such as thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes, pyrylium ion dyes, and diphenylidonium ion dyes. It is here noted that it is acceptable to use sensitizing dyes having absorption light at a wavelength less than 350 nm or greater than 600 nm.

The proportion of the volume hologram-forming material comprising the aforesaid matrix polymer (binder resin), photo-polymerizable compound, photo-polymerization initiator and sensitizing dye is given below.

The photo-polymerizable compound should be used in an amount of 1 part by weight to 100 parts by weight, and preferably 5 parts by weight to 10 parts by weight, per 100 parts by weight of binder resin.

The photo-polymerization initiator should be used in an amount of 1 part by weight to 10 parts by weight, and preferably 5 parts by weight to 10 parts by weight, per 100 parts by weight of binder resin.

The sensitizing dye should be used in an amount of 0.01 part by weight to 1 part by weight, and preferably 0.01 part by weight to 0.5 parts by weight, per 100 parts by weight of binder resin.

Other volume hologram-forming materials, for instance, are plasticizers, glycerin, diethylene glycol, triethylene glycol and a variety of nonionic, anionic and cationic surface active agents.

The volume hologram-forming material is dissolved in a suitable solvent such as acetone, methyl ethyl ketone, methyl isobutyl ketone, cyclohexanone, benzene, toluene, xylene, chlorobenzene, tetrahydrofran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol and isopropanol or a mixture thereof to form a coating solution having a solid content of 15% to 25%.

If the support film is in a sheet form, the coating solution may be applied thereto by means of bar coating, spin coating, dipping or the like, and if the support film is a roll or continuous form, the coating solution may be applied thereto by means of gravure coating, roll coating, die coating, comma coating or the like. In either case, the coating solution is solidified by drying or curing means fitting for the type of the coating solution used. The thus obtained volume-forming material has a thickness of 0.1 µm to 50 µm, and preferably 5 µm to 20 µm.

For the hologram recording material, for instance, it is preferable to use the "OmniDex Series" of hologram recording materials, Du Pont.

For this hologram recording material, use may also be made of a photo-polymerizable composition comprising a binder resin, a radical polymerizing agent, a cationic polymerizing agent, a sensitizing dye, a radical polymerizable monomer and a cationic polymerizable monomer.

Preferably, a cover film is applied over the volume hologram-forming material obtained by coating the coating solution on the support film before the material is exposed to hologram information. For the cover film laminated over the volume hologram-forming material by means of a rubber roller, it is preferable to use films of high transparency, high smoothness and 1 µm to 1 mm, preferably 10 µm to 100 µm in thickness, for instance, PET films, polyethylene films, polypropylene films, polyvinyl chloride films, acrylic films, triacetyl cellulose films, and cellulose acetate butyrate films. Instead of laminating such a transparent film as mentioned above over the volume hologram-forming material, a material having film formation capability such as triacetyl cellulose, polyvinyl alcohol or polymethyl methacrylate may be dissolved in a suitable solvent to form a coating solution, which is then spin coated or otherwise coated.

The volume hologram-forming material is then directly irradiated on the support film with two beams of laser light, for instance, an argon ion laser (of 514.5 nm wavelength) and a krypton ion laser (of 647 wavelength), with the cover film remaining fixed thereon or removed therefrom, to record therein light of interference between object light and reference light. Alternatively, an original hologram is brought into direct contact with the volume hologram-forming material with the protective film removed therefrom. Then, the volume hologram-forming material is irradiated on the support film with an argon ion laser (of 514.5 nm wavelength) to record therein interference fringes defined by the incident light and the light reflected from the original hologram. In either case, volume hologram information is imparted to the volume hologram-forming material. If laser light having bright-lines of 476.5 nm, 532 nm and 647 nm wavelengths is used as a recording light source, it is then possible to obtain a full-color hologram. After recording, the resulting volume hologram layer is stabilized by steps of decomposing the photo-polymerization initiator by irradiation with ultraviolet rays of 0.1 to 10,000 mJ/cm$^2$, preferably 10 to 1,000 mJ/cm$^2$ from a suitable light source such as a super high pressure mercury-vapor lamp, a high pressure mercury-vapor lamp, a carbon arc lamp, a xenon arc lamp or a metal halide lamp, and diffusing and migrating the photo-polymerizable compound by heating, e.g., a 24-minute heating at 120° C.

It is here noted that apart from the color of the hologram image, the volume hologram layer 2 of the present invention is kept colorless and transparent or, even if slightly colored by various factors, has enough transparency to visible light.

The volume hologram layer 2 obtained by the aforesaid process contains a volume hologram in the cured resin layer and has a structure wherein it is stacked on the support film. The support film may be released off upon the formation of the volume hologram layer. Alternatively, the support film may remain fixed on the volume hologram layer 2 for the purpose of preventing injuring and contamination of the exposed surface of the volume hologram layer 2, which may otherwise occur at the following processing steps. If required or just before the volume hologram layer 2 is used as the hologram transfer foil, the support film is released off. When the releasable protective layer to be described later is not needed, the support film itself may be used as the substrate in the hologram transfer foil.

In the volume hologram of the volume hologram layer, interference fringes corresponding to the wavefront of light from an object are recorded in the form of transmittance modulation or refractive index modulation in the volume hologram layer. The advantage of this volume hologram is that it can be easily replicated by exposure and development of a volume hologram-forming material in close contact with an original hologram.

The first heat seal layer 3 is provided to bond the volume hologram layer 2 obtained as mentioned above to the second heat seal layer 4. As in the case of the second heat seal layer to be described later, the first heat seal layer 3, too, may be transparent and uncolored. However, when the first heat seal layer is colored, it is preferable to keep the first heat seal layer transparent and uncolored and color the second heat seal layer to be described later. This is because a problem arises in connection with the migration of a coloring agent to the volume hologram layer. Consequently, it is possible to obtain a hologram image of good contrast without any influence on the migration of the dye to the volume hologram.

For instance, the first heat seal layer is formed of a solvent type thermoplastic resin and an aqueous thermoplastic resin. Examples of the solvent type thermoplastic resin are ethylene-vinyl acetate copolymer resins, polyamide resins, polyester resins, polyethylene resins, ethylene-isobutyl acrylate copolymer resins, butyral resins, polyvinyl acetate resins and their copolymer resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS and SEPS, and reactive hot melt resins. For this purpose commercial products are available, for instance, AD1790-15 made by Toyo Morton Co., Ltd. and M720AH made by Dai Nippon Inc. Co. (DIC), each an ethylene-vinyl acetate copolymer resin, A-928 made by DIC, which is a polyester resin, A-450 made by DIC, which is an acrylic resin, and A-100Z-4 made by DIC, which is a vinyl chloride-acetate resin.

The solvent type thermoplastic resin is dissolved in a solvent such as toluene or methyl ethyl ketone to obtain a coating solution, which is then coated on a temporary carrier or a release film having a smooth surface by means of a comma coater, a die coater, a gravure coater or the like at a post-drying thickness of 2 to 20 μm. This coating solution may be directly coated on the volume hologram layer 2. However, the solvent may have an adverse influence on the hologram recording in the hologram layer. It is thus preferable to coat and dry the coating solution on the temporary carrier to form a layer and then putting this layer on the volume hologram layer under pressure.

It is here noted that when the solvent type thermoplastic resin is used, it is preferable to add the solvent-soluble type photo-polymerizable compound referred to as the component of the volume hologram layer 2, plasticizers, tackifiers and surface active agents to the first heat seal layer 3 in the amounts undetrimental to the adhesion of the first heat seal layer 3. This is because these additives migrate into the volume hologram layer 2 to impart thereto the so-called "tuning action" that swells or contracts the volume hologram layer, so that the color tone of the image information reconstructed can be controlled. However, when a solvent-soluble type dye is used for the second heat seal layer to be described later, it is required to use a solventinsoluble type dye or pigment as the coloring agent for the second heat seal layer 2, because the dye may possibly migrate into the hologram layer via the first heat seal layer.

The first heat seal layer should preferably be formed of an aqueous thermoplastic resin. Usable to this end are commercial products V-100 and V-200 made by Mitsui Chemical Industries, Ltd., each a vinyl acetate copolymer polyolefin, EC-1700, MC-3800, MC-4400 and HA-1100 made by Chuo Rika Kogyo Co., Ltd., each an ethylene vinyl acetate copolymer resin, AC-3100 made by Chuo Rika Kogyo Co., Ltd., which is an ethylene methacrylate (EMMA) copolymer resin, and AP-60LM made by DIC, which is a polyester type urethane.

The aqueous thermoplastic resin is dissolved in water or an alcoholic solvent such as propanol to obtain a coating solution, which is then coated on the hologram layer at a post-drying thickness of 2 to 20 μm by means of a comma coater, a die coater, a gravure coater or the like. In this case, the coating solution may be directly coated on the volume hologram layer. However, it is preferable to coat the coating solution on a temporary carrier and then put the resulting coating on the volume hologram layer for pressure lamination.

The advantage of the aqueous first heat seal layer is that no limitation is imposed on the dye used because even when the second heat seal layer to be described later is colored with a solvent-soluble dye, the migration of the dye into the volume hologram layer can be prevented.

The second heat seal layer 4 is provided to bond the first heat seal layer to an application member by thermo-compression, and may be formed of a material selected from the aforesaid solvent type adhesives with its adhesion to the application member in mind. The application member, for instance, may be a polyvinyl chloride sheet, a polystyrene sheet, a PET sheet, and high quality paper. In view of adhesion to these application members, an appropriate selection may be made from heat sealing agents such as AD1790-15 made by Toyo Morton Co., Ltd. and M-720AH made by DIC, each an ethylene-vinyl acetate copolymer resin, A-928 made by DIC, which is a polyester resin, A-450 made by DIC, which is an acrylic resin, and A-100Z-4 made by DIC, which is a vinyl chloride-acetate resin.

The second heat seal layer 4 may be uncolored and transparent. However, it is preferable to incorporate a coloring agent in the second heat seal layer to form a background for a hologram image. When this second heat seal is used for a label, it is possible to see through a hologram image or achieve a hologram image of high contrast.

For the coloring agent, pigments and dyes may be used alone or in admixture. Exemplary pigments are black pigments such as carbon black, copper-iron-manganese and Aniline Black, other colored pigments such as Naphtol Red F5RK and Phthalocyanine Blue, and infrared reflecting pigments, which may be used alone or in admixture. When a colored infrared reflecting pigment is used as the pigment, the back layer in the hologram recording layer can be placed in a state different from visible light and so can be used for prevention of illegal copying, identification papers or the like. The pigment used herein should preferably have an average particle diameter of 10 μm or less, and especially 1 μm or less. A pigment having an average particle size exceeding 10 μm is likely to make the surface of the second heat seal layer irregular, and disturb the interference fringes recorded in the volume hologram layer because the volume hologram layer itself is in a soft condition. In addition, a hologram image becomes dark with pinholes scattered therein. In other words, it is desired that the second heat seal layer should have a surface smoothness of ±0.5 μm or less, and preferably +0.2 μm or less. Such a surface smoothness is easily achievable by forming the pigment-containing second heat seal layer on a release film having a smooth surface, then removing the release film, and finally heat transfer the surface of the second heat seal layer, from which the release film has been removed, onto the first heat seal layer.

Exemplary dyes are black dyes such as Acid Black, Chrome Black and Reactive Black, and dyes such as Disperse Red, Cation Blue and Cation Yellow, which may be used alone or in admixture.

The amount of the pigment or dye incorporated in the second heat seal layer should be 1% by weight to 40% by weight, and preferably 10% by weight to 30% by weight. An amount exceeding 40% by weight is not preferable because of a drop of heat sealability.

The colored second heat seal layer should have an O.D. value of 1.5 or greater, and preferably 1.9 or greater, and absorb at least 50%, and preferably at least 80%, of light having a diffraction wavelength through the volume hologram layer, so that a hologram image of excellent contrast can be obtained.

The colored second heat seal layer 4 is provided on the first heat seal layer 3 by dissolving or dispersing the pigment or dye together with an adhesive in a solvent such as ethyl acetate, toluene or methyl ethyl ketone, and coating the resulting solution on the first heat seal layer at a post-drying thickness of 0.5 μm to 100 μm, and preferably 1 μm to 50 μm by means of a comma coater, a die coater, a gravure coater or the like.

The colored second heat seal layer 4 may be formed on the first heat seal layer 3 by coating the aforesaid coating solution directly thereon or using a temporary carrier on which the coating solution is coated. Alternatively, the colored second heat seal layer 4 and the first heat seal layer 3 may be formed on the temporary carrier in this order. This double-layer structure is laminated on the first heat seal layer 3 side over the volume hologram layer 2, followed by thermo-compression transfer.

Figure 2:
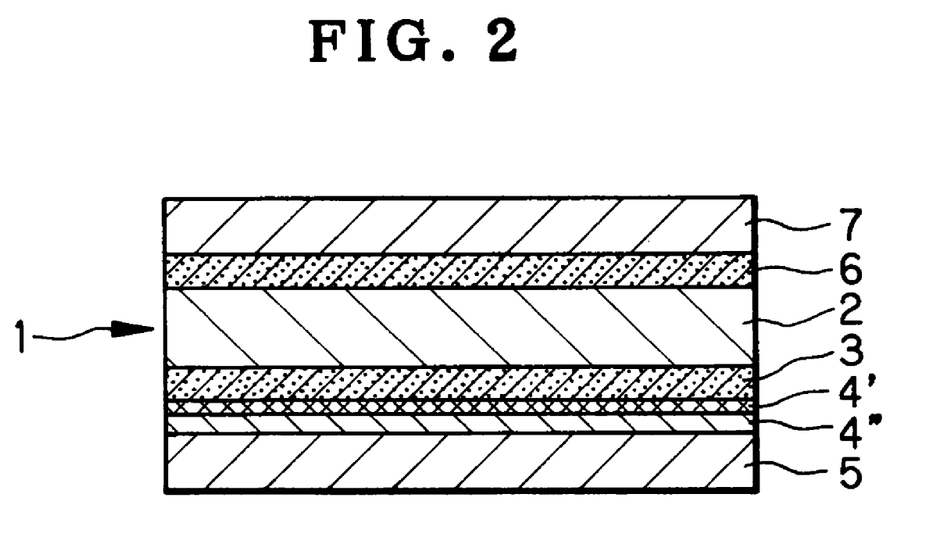
FIG. 2 is a sectional view illustrative of another embodiment of the hologram transfer foil of the invention.

As shown in FIG. 2, the colored second heat seal layer 4 may be constructed in a multilayer form comprising a colored layer 4' and a second heat seal layer 4" in order from the first heat seal layer side. In this case, the second heat seal layer 4" is applied to an application member. In other words, a multilayer structure comprising the colored layer 4' and second heat seal layer 4" is used in place of the colored second heat seal layer 4.

The colored layer 4' may be constructed of an ink layer comprising a binder and a coloring agent. For the binder, any desired material having adhesion to both the first heat seal layer 3 and the second heat seal layer 4" may be used. For instance, use may be made of polyurethane resins, polyester resins, polyacrylic resins, vinyl chloride resins, vinyl acetate resins, vinyl chloride-vinyl acetate copolymer resins, polyolefin resins, ethylene-vinyl acetate copolymer resins, styrene-butadiene copolymer resins, and polyamide resins.

For the coloring agent, the pigments or dyes mentioned with reference to the colored second heat seal layer 4 may be used alone or in admixture. The content of the pigment or dye in the colored layer 4" is 1% by weight to 40% by weight and preferably 10% by weight to 30% by weight, and is larger than that in the colored second heat seal layer 4. The colored layer 4" should preferably have an O.D. value of at least 1.5 and especially at least 1.9, and absorb at least 50%, and especially at least 80%, of light having a diffraction wavelength through the volume hologram layer, so that a hologram image of much better contrast can be obtained.

To obtain the colored layer, the pigment or dye is dispersed in a binder to form an ink. Then, the ink is coated on the second heat seal layer 4" at a post-drying thickness of 0.5 $\mu$m to 100 $\mu$m, and preferably 1 $\mu$m to 50 $\mu$m by means of a comma coater, a die coater or a gravure coater. The colored layer should preferably be formed on the first heat seal layer 3 or the second heat seal layer 4" by coating the ink directly thereon.

The second heat seal layer 4" should preferably be formed using the solvent type adhesive mentioned with reference to the colored second heat seal layer 4. The adhesive is diluted by a diluent to a viscosity capable of coating, and is coated on the colored layer 4" at a post-drying thickness of 0.5 $\mu$m to 100 $\mu$m, and preferably 1 $\mu$m to 50 $\mu$m by means of a comma coater, a die coater or a gravure coater.

The heat seal layer 4" may be formed on the colored layer 4' by coating the coating solution directly thereon. Alternatively, a releasable sheet 5 with the coating solution coated directly thereon may be stacked on the colored layer 4'. Still alternatively, the second heat seal layer 4" and colored layer 4' are formed by coating on the releasable sheet 5 in this order. Then, the resulting multilayer structure is stacked on the colored layer 4' side over the first heat seal layer 3. Further, a multilayer structure comprising the releasable sheet 5 with the second heat seal layer 4", colored layer 4' and first heat seal layer 3 formed thereon in this order is laminated on the first heat seal 3 side over the volume hologram layer 2, followed by thermo-compression transfer.

When the colored second heat seal layer is constructed of a multilayer structure comprising a colored layer and a second heat seal layer in order from the first heat seal layer side, it is possible to prevent the migration of the coloring component in the colored layer into the volume hologram layer and achieve a hologram image of higher contrast. In addition, the second heat seal layer is especially useful for illegal hologram replacement because its adhesion to the application member is improved due to the absence of any coloring agent.

While the colored layer 4' is formed by coating in consideration of ease with which the hologram transfer foil can be torn off, it is noted that the colored layer 4' may be formed into a colored film. In this case, the colored film may have been slit or otherwise nicked in such a way as to easily tear off the hologram transfer foil.

A light reflecting layer may also be used as the colored layer 4'. For the light reflecting layer, it is preferable to use a metal thin film capable of reflecting light. The light reflecting layer may be formed by known processes such as sublimation, vacuum evaporation, sputtering, reactive sputtering, ion plating, and electroplating. For instance, use may be made of thin films of metals such as Cr, Ti, Fe, Co, Ni, Cu, Ag, Au, Ge, Al, Mg, Sb, Pb, Pd, Cd, Bi, Sn, Se, In, Ga and Rb and their oxides and nitrides, which may be used alone or in combination of two or more. Of these, thin films of Al, Cr, Ni, Ag and Au are especially preferred with a thickness of 1 to 10,000 nm, and preferably 20 to 200 nm. With such a metal thin film it is possible to improve the visibility and design of a hologram image.

Figure 3:
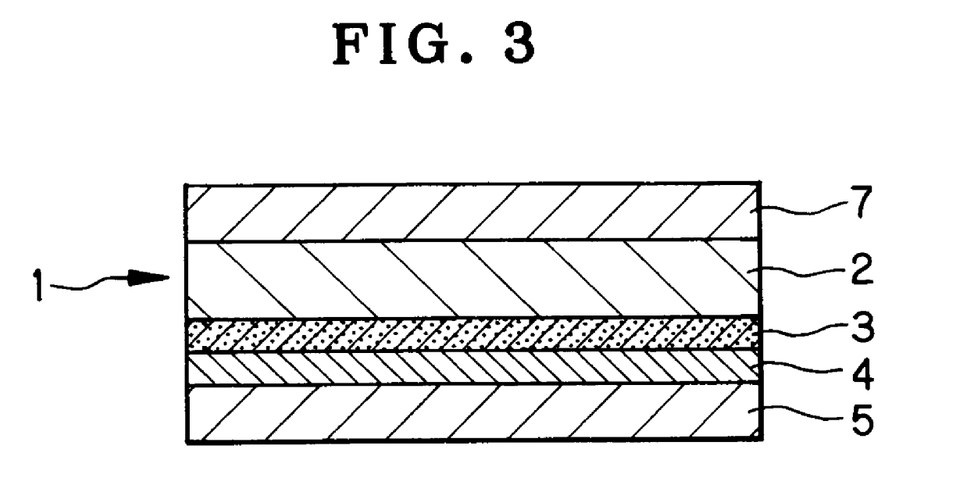
FIG. 3 is a sectional view illustrative of yet another embodiment of the hologram transfer foil of the invention.

In the present invention, the releasable sheet 5 is provided as shown in FIGS. 1 to 3. To this end, not only ordinarily used release paper but also a releasable film obtained by treating a polyethylene terephthalate or polypropylene resin film with a releasing agent such as a fluorine or silicone releasing agent may be used.

As shown in FIGS. 1 and 2, the releasable protective layer 6 is formed on the volume hologram layer 2. This releasable protective layer must have adhesion to the volume hologram layer 2 and releasability from the substrate 7. After the substrate 7 is released off, the releasable protective layer is required to have functions such as hard coatability, printability and slip capability because it must serve as a protective layer for the volume hologram layer 2. In view of protection of the volume hologram layer after the substrate 7 is released off, it is preferable to form this releasable protective layer using methacrylate resins such as polymethyl methacrylate, and at least tri-functional, preferably at least hexa-functional, ionizing radiationcurable epoxymodified acrylate resins, urethane-modified acrylate resins or acrylic-modified polyester resins, which are all reactive with ionizing radiation such as ultraviolet or electron radiation. To improve each of such functions, at least one component selected from polyacrylic acid ester resins, polyvinyl chloride resins, cellulose resins, silicone resins, chlorinated rubber, casein, surface active agents, waxes and metal compounds is added to the main resin to form a coating solution. This coating solution is then formed into a film having a post-drying thickness of 0.1 $\mu$m to 3 $\mu$m, thereby obtaining a releasable protective layer improved in terms of peel force, tear-off capability and surface protection capability.

In consideration of the influences of additives, solvents, etc. on the volume hologram layer, it is not preferable to form the releasable protective layer directly on the volume hologram layer. In other words, it is preferable to form a coating film on a substrate using the releasable protective layer-forming coating solution and then laminate the substrate on the volume hologram layer by thermo-compression transfer.

The substrate 7 is used as a temporary carrier on the releasable protective layer 6. After the hologram transfer foil is heat laminated on the second heat seal layer side over the application member, this substrate is released from the releasable protective layer 6. The substrate 7, for instance, may be formed of films such as polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyester films such as polyethylene terephthalate films, and polyimide films, and has a thickness of 2 µm to 200 µm, preferably 10 µm to 50 µm. The peel force of the substrate 7 should preferably be controlled by appropriately selecting the type of the substrate, the material of the releasable protective layer, etc. in such a way that the substrate is releasable from the interface of the releasable protective layer. To be more specific, the substrate 7 should preferably have a peel force of 1 to 100 gf/inch (90° peeling), and preferably 1 to 5 gf/inch.

As shown in FIG. 3, the releasable protective layer 6 may be dispensed with when the substrate 7 has been treated with a fluorine or silicone release agent, when the substrate 7 has contained a release agent in such a way as to be releasable by itself, or when the volume hologram layer has been designed to be releasable from the substrate by the curing of the volume hologram layer itself after the substrate—free from releasability—had been laminated on the uncured volume hologram layer.

Figure 4:
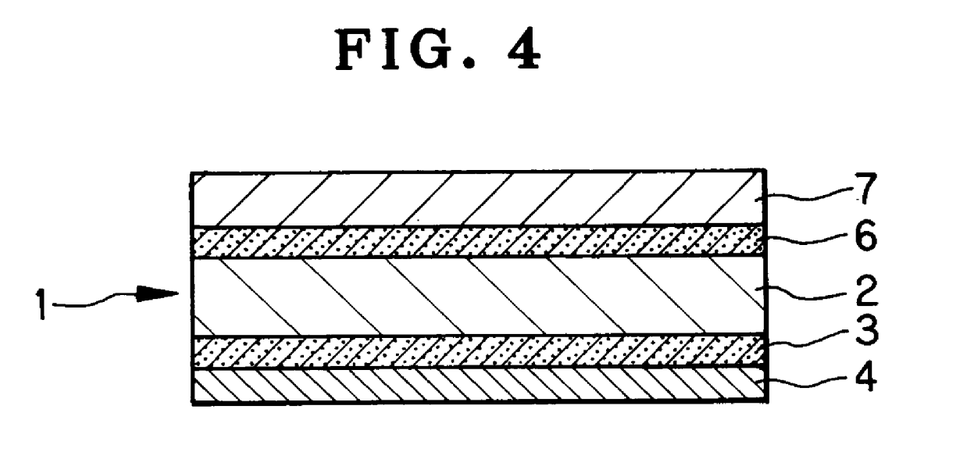
FIG. 4 is a sectional view illustrative of a further embodiment of the hologram transfer foil of the invention.

As shown in FIG. 4, the releasable sheet 5 may be dispensed with when the second heat seal layer 4 does not suffer blocking where it is stacked on other hologram transfer foil or in a rolled state. Yet it is preferable to laminate the releasable sheet 5 on the second heat seal layer 4 because this ensures protection of the second heat seal layer 4 during storage.

Why any illegal copying of the volume hologram transferred using the hologram transfer foil according to present invention can be prevented is now explained. Using the hologram transfer foil of the invention, the volume hologram is transferred onto an application member. In this case, the adhesion force between the volume hologram layer and the application member and the material fracture force for the volume hologram layer should have such relationships that if the volume hologram is forcibly peeled from the application member for faking purposes, then a hologram image cannot be reconstructed due to a material fracture of the volume hologram layer. If the application member is a picture or high-quality paper having a limited material fracture force, a material fracture of the application member occurs upon forced peeling of the volume hologram for faking purposes, thereby preventing illegal copying of the volume hologram.

In the present invention, however, the adhesion force between the volume hologram layer and the application member must be larger than the material fracture force for the volume hologram layer or the application member.

The material fracture force for volume hologram layers or application members is represented in terms of breaking strength as measured according to JIS K7127-1989. The volume hologram layer used herein has a breaking strength of the order of 0.01 kg/mm² to 5 kg/mm², and usually 0.03 kg/mm² to 3 kg/mm², and high-quality paper has a breaking strength of 3.0 kg/mm² to 5.0 kg/mm².

The adhesion force between the volume hologram layer and the application member is measured according to peel testing (JIS K6301), and should preferably be controlled between about 2,000 gf/inch and about 3,000 gf/inch by an appropriate selection of the first and second heat seal layers.

In numerical parlance, the material fracture force for the volume hologram layer or application member cannot directly be compared with the adhesion force between the volume hologram layer and the application member. However, this can be easily understood from whether the material fracture of the volume hologram layer or the material fracture of the application member occurs upon intentional peeling of the volume hologram layer from the application member. Referring here to an index of the values of the material fracture force for the volume hologram layer or application member and the adhesion force between the volume hologram layer and the application member, when the breaking strength of the volume hologram layer is 2.30 kg/mm² as an example, the adhesion force between the hologram layer and the application member must be at least 1,000 gf/inch. This ensures that the material fracture of the hologram layer or application member occurs upon intentional peeling of the volume hologram layer from the application member for faking purposes, thereby achieving prevention of any illegal copying of the hologram.

The hologram transfer foil of the present invention is preferably fabricated by providing each multilayer structure on a temporary carrier to obtain a transfer member and then laminating the respective multilayer structures by thermocompression transfer in order depending on the layer arrangement of the hologram transfer foil, as described in the examples to be given later. However, suitable layers, for instance, the first and second heat seal layers may be combined together on a temporary carrier to form a transfer member for hologram transfer foil fabrication. The temperature for thermo-compression transfer should be 25° C. to 120° C., and preferably 60° C. to 100° C. at which the volume hologram recorded in the volume hologram layer is not adversely affected.

In use, the release sheet is first peeled from the hologram transfer foil of the present invention. Then, the hologram transfer foil is thermo-compressed onto the application member to be described later at a temperature of 60° C. to 200° C., preferably 100° C. to 160° C. and a pressure of 0.5 Mpa to 15 Mpa although varying with the type of the application member, so that the volume hologram layer can be transferred onto the application member. If required, the substrate may be removed.

The hologram transfer foil of the present invention can be used with a variety of application members, because the first heat seal layer is excellent in adhesion to the volume hologram layer and the second heat seal layer is excellent in adhesion to the application member. When both the first and second heat seal layers are transparent, the surface of the application member can be seen through. In addition, the colored hologram transfer foil can form a background for a hologram image, thereby obtaining a hologram image of excellent contrast. However, if the colored hologram transfer foil is allowed to have a low color density, it is useful for prevention of illegal copying of the volume hologram transferred, etc., because light can transmit through the lower layer.

The hologram transfer foil of the present invention may be applied to transparent or opaque glasses or plastic products. For instance, the hologram transfer foil of the invention may be used for plastic products made up of vinyl chloride resins, acrylic resins, polystyrene resins, polyester resins such as polyethylene terephthalate, and polycarbonate resins.

Exemplary products or articles made up of these resin materials are windows, observation windows or doors of the means or facilities of transportation such as motorcars, railway trains, ships or airplanes as well as windows, doors, fixed sash windows and transoms of buildings. The hologram transfer foil of the present invention may also be applied to transparent glasses or transparent plastic sheets on the surfaces of instruments and displays located around drivers' seats, control decks or like sites in such means of transportation.

The hologram transfer foil of the present invention may be applied to the surfaces of displays of various devices such as electric appliances, clocks or watches and cameras, some being not always colorless and transparent, and some being black when put off. Such devices also include those having display functions, e.g., calculators, portable terminal equipment such as portable personal computers, portable phones, IC recorders, CD players, DVD players, MD players, video tape recorders and audio equipment. The hologram transfer foil of the invention, when it can be seen through, may applied to such devices while the hologram image of the volume hologram layer 2 can be superposed thereon without detrimental to the display functions inherent therein. To add to this, the hologram transfer foil of the invention may be applied to upscale wristwatches, jewels, noble metals, antiques or their cases for the purpose of warranting that they are genuine, taking advantage of difficulty of fabrication of the volume hologram layer 2 in the hologram transfer foil. In this case, the hologram transfer foil may be applied to such articles irrespective of whether they are transparent or opaque.

The hologram transfer foil of the present invention may be applied to sheets such as identification papers and certificates for examination, cards such as ID cards and booklets such as passports, or may be used as certificates indicating public security and health ranks for fire prevention, sterilization, etc. In principal, the hologram transfer foil of the invention may be used as equivalents to paper certifications sealed on articles that are transparent and in a substantially flat sheet or quadratic surface form. In addition, the hologram transfer foil of the invention may be applied to films or sheets made up of paper, synthetic paper, synthetic resins and metals as well as articles including glass or other parts. By taking advantage of volume hologram's unique properties of making it possible to reconstruct three-dimensional images, the hologram transfer foil of the invention may be used as labels affixed to books or saddle stitched magazines such as monthlies, automotive glass windows, premium commodity goods, etc.

The hologram image in the volume hologram layer 2 may be designed in conformity to what field and purpose it is used in and for, and may arbitrarily carry symbols and characters indicative of the necessary meanings. A hologram image itself may be obtained by recording actual objects in hologram photosensitive materials or by designing hologram diffraction gratings by calculation or processing digital images obtained using digital cameras or two- or three-dimensional images obtained from computer graphics by suitable means such as holographic stereography.

The hologram transfer foil of the present invention may have been cut in conformity to the shape of an application article or part. When the hologram transfer foil of the invention includes the releasable sheet 5, it is preferable to make a notch in portions of the hologram transfer foil other than the releasable sheet 5. This is because individual labels of given shape can be taken out of the hologram transfer foil that is of large size or in a rolled-up form for application to articles. Such processing may be carried out by making a notch. To make a notch only in the portions of the hologram transfer foil other than the releasable sheet 5, it is preferable to vertically move a blade at a stroke corresponding to the thickness of the releasable sheet 5.

It is also preferable to remove respective layers other than the releasable sheet between adjacent hologram transfer foils, leaving individual hologram transfer foils of given shape. In this case, the releasable sheet may be provided at its boundaries with perforations along which individual hologram transfer foils are detachable.

The present invention is now explained with reference to examples.

EXAMPLE 1

Multilayer Structure A Having a Hologram-Forming Layer

A PET film/hologram recording material/releasable PET film (HRF800×001, Du Pont) was provided.

Multilayer Structure B Having a Releasable Protective Layer

Polymethyl methacrylate resin (with a weight-average molecular weight of 95,000) 96.7 parts by weight Polyester resin (with a weight-average molecular weight of 1,500, Nippon Polyurethane Co., Ltd.) 0.3 parts by weight Polyethylene wax (with a weight-average molecular weight of 8,000, Gifu Cellac Co., Ltd.) 3 parts by weight.

These components were dissolved and dispersed in methyl ethyl ketone. Then, the obtained coating solution was coated on a PET film using a gravure coater to obtain a multilayer structure having a releasable protective film of 1 $\mu$m in post-drying thickness.

Multilayer Structure C Having a First Heat Seal Layer

Sixty (60) parts by weight of an ethylene-vinyl acetate copolymer (EC1700, Chuo Rika Co., Ltd.) were dissolved in 40 parts by weight of isopropyl alcohol to obtain a coating solution. Then, this coating solution was coated on a releasable PET film using a gravure coater to obtain a multilayer structure having a first heat seal layer of 2 $\mu$m in post-drying thickness.

Multilayer Structure D Having a Second Heat Seal Layer

Fifty (50) parts by weight of an ethylene-vinyl acetate copolymer (AD1790-15, Toyo Morton Co., Ltd.) were dissolved in 50 parts by weight of toluene to obtain a coating solution. Then, this coating solution was coated on a releasable PET film using a gravure coater, thereby obtaining a multilayer structure having a second heat seal layer of 2 $\mu$m in post-drying thickness.

A Lippmann type hologram was recorded in the multilayer structure A having a hologram-forming layer, using laser light of 514 nm wavelength, which was then heated at 100° C. for 10 minutes. After the releasable PET film was released from the multilayer structure A with the Lippmann type hologram recorded therein, the multilayer structure B was heat laminated at 80° C. on the releasable protective layer side over the hologram layer in the multilayer structure A, thereby obtaining a multilayer structure comprising a PET film/releasable protective layer/volume hologram layer/PET film.

Using a high pressure mercury-vapor lamp, the volume hologram in this structure was fixed. Then, the PET film was released from the volume hologram layer to laminate the multilayer structure C on the first heat seal layer side over the volume hologram layer at 100° C., followed by a release of the releasable PET film. Finally, the multilayer structure D was heat laminated on the second heat seal layer side over the first heat seal layer at 100° C.

In this way, a transparent hologram transfer foil comprising a PET film/releasable protective layer/volume hologram layer/first heat seal layer/second heat seal layer/releasable PET film was obtained.

COMPARATIVE EXAMPLE 1

After the volume hologram layer in the PET film/releasable protective layer/volume hologram layer/PET film multilayer structure obtained in Example 1 was fixed using a high pressure mercury-vapor lamp, the PET film was released from the volume hologram layer.

Then, the multilayer structure C referred to in Example 1 was laminated on the 4 μm thick first heat seal layer side over the volume hologram layer at 100° C.

In this way, a transparent hologram transfer foil comprising a PET film/releasable protective layer/volume hologram layer/4 μm thick first heat seal layer/releasable PET film was obtained.

COMPARATIVE EXAMPLE 2

After the volume hologram layer in the PET film/releasable protective layer/volume hologram layer/PET film multilayer structure obtained in Example 1 was fixed using a high pressure mercury-vapor lamp, the PET film was released from the volume hologram layer.

Then, the multilayer structure D was laminated on the 4 μm thick second heat seal layer side over the volume hologram layer at 100° C.

In this way, a transparent hologram transfer foil comprising a PET film/releasable protective layer/volume hologram layer/4 μm thick second heat seal layer/releasable PET film was obtained.

Testing for Peel Strength of Adhesive

Each of the transparent hologram transfer foils obtained in Example 1 and Comparative Examples 1 and 2, from which the releasable PET film was peeled, was stacked on a polyvinyl chloride card at 120 to 140° C. for heat transfer of the volume hologram having a releasable protective layer on its surface. The adhesion force between the obtained volume hologram and the polyvinyl chloride card was measured according to the testing for peel strength of adhesives (JIS K6301). The results are shown in Table 1.

TABLE 1

|  | Adhesion Force in gf/inch | After Peeling |
| --- | --- | --- |
| Ex.1 | >3,000 | Material fracture of volume hologram layer found |
| Comp. Ex. 1 | 857.8 | Heat seal layer peeled off application member |
| Comp. Ex. 2 | 650.2 | Volume hologram layer peeled off heat seal layer |

EXAMPLE 2

A transparent hologram transfer foil comprising a PET film/releasable protective layer/volume hologram layer/first heat seal layer/second heat seal layer/releasable PET film was obtained as in Example 1 with the exception that M-720AH made by DIC was used for the second heat seal layer in the multilayer structure D in Example 1.

EXAMPLE 3

A transparent hologram transfer foil comprising a PET film/releasable protective layer/volume hologram layer/first heat seal layer/second heat seal layer/releasable PET film was obtained as in Example 1 with the exception that A-928 made by DIC was used for the second heat seal layer in the multilayer structure D in Example 1.

EXAMPLE 4

A transparent hologram transfer foil comprising a PET film/releasable protective layer/volume hologram layer/first heat seal layer/second heat seal layer/releasable PET film was obtained as in Example 1 with the exception that A-450 made by DIC was used for the second heat seal layer in the multilayer structure D in Example 1.

EXAMPLE 5

A transparent hologram transfer foil comprising a PET film/releasable protective layer/volume hologram layer/first heat seal layer/second heat seal layer/releasable PET film was obtained as in Example 1 with the exception that A-100Z-4 made by DIC was used for the second heat seal layer in the multilayer structure D in Example 1.

Using each of the hologram transfer foils obtained in Examples 1 to 5, the volume hologram layer was transferred onto a polyvinyl chloride card, a polystyrene card, a polyethylene terephthalate card, and a high-quality paper card, respectively, as in Example, and adhesion force was measured as in Example 1. The results are shown in Table 2.

In Tables 1 and 2, the adhesion force for the combination of the polyvinyl chloride card with Example 1, for instance, is described as ">3.0 Kgf/inch". This is because a material fracture of the volume hologram layer was found at 3.0 Kgf/inch in the adhesion force testing run; the adhesion force was found to be at least 3.0 Kgf/inch.

TABLE 2

|  | Polyvinyl Chloride | Polystyrene | PET | High-Quality Paper |
| --- | --- | --- | --- | --- |
| Example 1 | *1<br>>3.0 kgf/inch | *1<br>>3.0 kgf/inch | *1<br>>3.0 kgf/inch | *2<br>>330 gf/inch |
| Example 2 | *1<br>>3.0 kgf/inch | *1<br>>3.0 kgf/inch | *1<br>>3.0 kgf/inch | *2<br>>330 gf/inch |
| Example 3 | *1<br>>3.0 kgf/inch | 20 gf/inch | 663 gf/inch | *2<br>>330 gf/inch |
| Example 4 | 94.7 gf/inch | 241 gf/inch | 259 gf/inch | *2<br>>330 gf/inch |
| Example 5 | 125 gf/inch | 19.9 gf/inch | 58.8 gf/inch | *2<br>>330 gf/inch |

*1: Material fracture of volume hologram layer
*2: Material fracture of application member As can be understood from Table 2, Examples 1 and 2 ensure prevention of illegal copying of the volume hologram transferred irrespective of whether the application member is polyvinyl chloride, polystyrene, polyterephthalate or high-quality paper. Example 3 ensures prevention of illegal copying of the volume hologram transferred when the application member is polyvinyl chloride or high-quality paper, and Examples 4 and 5 ensure prevention of illegal copying of the volume hologram transferred when the application member is high-quality paper.

In the combinations of the polyvinyl chloride card with Examples 4 and 5 as well as in the combinations of polystyrene and PET with Examples 3, 4 and 5, the second heat seal layer peeled off the application member and the volume hologram layer peeled off the second heat seal layer due to decreased adhesion force.

EXAMPLE 6

Multilayer Structure A Having a Hologram-Forming Layer

A PET film/hologram recording material/releasable PET film (HRF800x001, Du Pont) was provided.

Multilayer Structure B Having a Releasable Protective Layer

Polymethyl methacrylate resin (with a weight-average molecular weight of 95,000) 96.7 parts by weight Polyester resin (with a weight-average molecular weight of 1,500, Nippon Polyurethane Co., Ltd.) 0.3 parts by weight Polyethylene wax (with a weight-average molecular weight of 8,000, Gifu Cellac Co., Ltd.) 3 parts by weight.

These components were dissolved and dispersed in methyl ethyl ketone. Then, the obtained coating solution was coated on a PET film using a gravure coater to obtain a multilayer structure having a releasable protective film of 1 $\mu$m in post-drying thickness.

Multilayer Structure C Having an Uncolored First Heat Seal Layer

Sixty (60) parts by weight of an aqueous thermoplastic resin, viz., an ethylene-vinyl acetate copolymer (EC1700, Chuo Rika Co., Ltd.) were dissolved in 40 parts by weight of water to obtain a coating solution. Then, this coating solution was coated on a releasable PET film using a gravure coater to obtain a multilayer structure having an uncolored first heat seal layer of 2 $\mu$m in post-drying thickness.

Multilayer Structure D Having a Colored Second Heat Seal Layer

Forty-five (45) parts by weight of an ethylene-vinyl acetate copolymer (AD1790-15, Toyo Morton Co., Ltd.) and 5 parts by weight of a coloring agent, viz., black dye (Kayaset Black K-R, Nippon Kayaku Co. Ltd.) were dissolved in 50 parts by weight of toluene to obtain a coating solution. Then, this coating solution was coated on a releasable PET film using a gravure coater, thereby obtaining a multilayer structure having a colored second heat seal layer of 2 $\mu$m in post-drying thickness.

A Lippmann type hologram was recorded in the multilayer structure A, using laser light of 514 nm wavelength, which was then heated at 100° C. for 10 minutes. After the releasable PET film was released from the multilayer structure A with the Lippmann type hologram recorded therein, the multilayer structure B was heat laminated at 80° C. on the releasable protective layer side over the volume hologram layer in the multilayer structure A, thereby obtaining a multilayer structure comprising a PET film/releasable protective layer/volume hologram layer/PET film.

Using a high pressure mercury-vapor lamp, the volume hologram in this structure was fixed. Then, the PET film was released from the volume hologram layer to laminate the multilayer structure C on the uncolored first heat seal layer side over the volume hologram layer at 100° C., followed by a release of the releasable PET film. Finally, the multilayer structure D was laminated at 100° C. on the colored second heat seal layer side over the uncolored first heat seal layer.

In this way, a colored hologram transfer foil comprising a PET film/releasable protective layer/volume hologram layer/uncolored first heat seal layer/colored second heat seal layer/releasable PET film was obtained.

COMPARATIVE EXAMPLE 3

Using a high pressure mercury-vapor lamp, the volume hologram layer in the PET film/releasable protective layer/volume hologram layer/PET film multilayer structure obtained in Example 6 was fixed. Then, the PET film was peeled from the volume hologram to laminate the colored second heat seal layer side of the multilayer structure D on the volume hologram layer at 100° C. In this way, a colored hologram transfer foil comprising a PET film/releasable protective layer/volume hologram layer/colored second heat seal layer/releasable PET film was obtained.

Dye Migration Testing

Each of the colored hologram transfer foils obtained in Example 6 and Comparative Example 3, from which the releasable PET films had been peeled, was laminated by thermo-compression at 120 to 140° C. onto a polyvinyl chloride card to heat transfer the volume hologram layer thereto, with the releasable protective layer provided on its surface.

The volume hologram layer transferred had a strong adhesion force to the application card. In an effort to forcibly peel the volume hologram layer from the application card, the volume hologram layer broken down. When the volume hologram layer obtained in Comparative Example 3 was forcibly separated from the application card, however, exfoliation was found between the volume hologram layer and the colored second heat seal layer.

In the volume hologram layer obtained in Example 6, a hologram image could clearly be observed because of an improvement in the contrast of the hologram image to a background. In the volume hologram layer obtained in Comparative Example 3, on the other hand, the dye was found to migrate from the colored second heat seal layer thereinto from just after transfer or after the lapse of a few hours, and so a hologram image became too dark to observe.

EXAMPLE 7

Colored hologram transfer foils were prepared and thermo-compressed onto polyvinyl chloride sheets as in Example 6 with the exception that V-100, V-200, both made by Mitsui Chemical Industries, Ltd., EC-1200, MC-3800, MC-4400, HA-1100, AC-3100, all made by Chuo Rika Kogyo Co., Ltd., and AP-60LM made by DIC were used in place of the uncolored first heat seal layer.

Each of the transferred volume hologram layers had a strong adhesion force to the application sheet. In an effort to forcibly peel the volume hologram from the application sheet, the volume hologram layer broken down. In each volume hologram layer, a hologram image could clearly be observed by virtue of an improvement in the contrast of the hologram image to a background.

Colored hologram transfer foils were prepared and thermo-compressed onto polyvinyl chloride sheets as in Example 6 with the exception that A-100Z-4, M-720AH, A-450A and A-928, all made by Dai Nippon Ink Co., Ltd. were used in place of the colored second heat seal layer.

In each of the obtained volume hologram layers, a hologram image could clearly be observed by virtue of an improvement in the contrast of the hologram image to a background. Hologram transfer foils were prepared using M720AH and A-928 made by Dai Nippon Ink Co., Ltd. as the colored second heat seal layer. In an effort to forcibly peel each volume hologram layer from the application member, the volume hologram layer broken down due to its strong adhesion force to the application member.

COMPARATIVE EXAMPLE 4

Using a high pressure mercury-vapor lamp, the volume hologram in the PET film/releasable protective layer/volume hologram layer/PET film multilayer structure obtained in Example 6 was fixed. Then, the PET film was released from the volume hologram layer. Finally, a multilayer structure having an uncolored first heat seal layer, prepared as mentioned below, was laminated on 100° C. on the first heat seal side over the volume hologram layer.

Multilayer Having an Uncolored First Heat Seal Layer

Eighty (80) parts by weight of an ethylene-vinyl acetate copolymer resin (M-720AH, Dai Nippon Ink Co., Ltd.) were dissolved in 20 parts by weight of methyl ethyl ketone to obtain a coating solution. Then, this coating solution was coated on a releasable PET film using a gravure coater to obtain a multilayer structure having an uncolored first heat seal layer of 2 µm in post-drying thickness.

Then, the multilayer structure D obtained in Example 6 was laminated at 100° C. on the colored second heat seal layer side over this uncolored first heat layer.

In this way, a colored hologram transfer foil comprising a PET film/releasable protective layer/volume hologram layer/uncolored first heat seal layer/colored second heat seal layer/releasable PET film was obtained.

Using the obtained colored hologram transfer foil, the volume hologram was similarly transferred onto a polyvinyl chloride sheet. In an effort to forcibly peel the volume hologram from the application card, the volume hologram broken down because of its strong adhesion force to the application card. However, the dye was found to migrate from the colored second heat seal layer into the volume hologram layer from just after transfer or after the lapse of a few hours, and so a hologram image became too dark to observe.

EXAMPLE 8

First Multilayer Structure Comprising PET Film/Volume Hologram Recording Material/Releasable PET Film A coating solution of a hologram-forming material composed of 60 parts by weight of a volume hologram-forming photosensitive resin composition using as a basic binder a polymethyl methacrylate resin (Tg: 100° C.), 25 parts by weight of methyl ethyl ketone and 15 parts by weight of toluene was gravure coated on a 50 µm thick polyethylene terephthalate film (Lumirror T-60 made by Toray Industries, Inc.) to provide a coating of 10 µm in post-drying thickness. Then, a 50 µm thick PET film subjected to surface release treatment (SP-PET made by Tocello Co., Ltd.) was laminated on the coating surface to prepare a first multilayer structure.

Second Multilayer Structure Comprising PET Film/Releasable Protective Layer

Polymethyl methacrylate resin (with a weight-average molecular weight of 95,000) 96.7 parts by weight Polyester resin (with a weight-average molecular weight of 1,500, Nippon Polyurethane Co., Ltd.) 0.3 parts by weight Polyethylene wax (with a weight-average molecular weight of 8,000, Gifu Cellac Co., Ltd.) 3 parts by weight.

These components were dissolved and dispersed in methyl ethyl ketone. Then, the obtained coating solution was coated on a 50 µm thick PET film (Lumilar T-60, Toray Industries, Inc.) using a gravure coater to obtain a second multilayer structure having a releasable protective film of 1 µm in post-drying thickness.

Fourth Multilayer Structure Comprising Surface Releasable PET Film/Uncolored First Heat Seal Layer Sixty (60) parts by weight of an aqueous thermoplastic resin or an ethylene-vinyl acetate copolymer (EC1700, Chuo Rika Kogyo Co., Ltd.) were dissolved in 40 parts by weight of water to obtain a coating a solution. Then, this coating solution was coated on a 50 µm thick releasable PET film (SP-PET, Tocello Co., Ltd.) using a gravure coater to obtain a third multilayer structure having an uncolored first heat seal layer of 2 µm in post-drying thickness.

Fourth Multilayer Structure Comprising Releasable Sheet 5/Second Heat Seal Layer 4"/Colored Layer 4'

One hundred (100) parts by weight of a vinyl chloride-vinyl acetate copolymer resin (A-100Z-4, Dai Nippon Ink Co., Ltd.) were dissolved in 50 parts by weight of toluene to obtain a coating solution. Then, this coating solution was coated on a 50 µm thick releasable sheet (SP-PET, Tocello Co., Ltd.) using a gravure coater, thereby obtaining a second heat seal layer 4" of 2 µm in post-drying thickness.

Then, a colored layer-forming ink composed of 30 parts by weight of a polyurethane resin (Nipporan, Nippon Polyurethane Co, Ltd.), 3 parts by weight of a black pigment (Carbon Black, Mitsubishi Chemical Industries, Ltd.) and 67 parts by weight of a diluting solvent was coated on the second heat seal layer 4" using a gravure coater, thereby obtaining a fourth multilayer structure including a colored layer 4' having a post-drying thickness of 2 µm.

A Lippmann type hologram was recorded in the first multilayer structure having a hologram-forming layer, using laser light of 514 nm wavelength, which was then heated at 100° C. for 10 minutes. After the releasable PET film was released from the first multilayer structure with the Lippmann type hologram recorded therein, the second multilayer structure was heat laminated at 80° C. on the releasable protective layer side over the hologram layer in the first multilayer structure, thereby obtaining a multilayer structure comprising a PET film/releasable protective layer/volume hologram layer/PET film.

Using a high pressure mercury-vapor lamp, the volume hologram in this structure was fixed. Then, the PET film was released from the volume hologram layer to laminate the third multilayer structure on the uncolored first heat seal layer side over the volume hologram layer at 100° C., followed by a release of the releasable PET film. Finally, the fourth multilayer structure was heat laminated on the colored layer 4' side over the uncolored first heat seal layer at 100° C.

In this way, a colored hologram transfer foil comprising a PET film/releasable protective layer/volume hologram layer/uncolored first heat seal layer/colored layer 4'/second heat seal layer 4"/releasable sheet 5 was obtained.

Dye Migration Testing

In use, the release sheet was peeled from the colored hologram transfer foil obtained in Example 8. Then, this hologram transfer foil was laminated at 120 to 140° C. on a polyvinyl chloride card for heat transfer thereon of the volume hologram having a releasable protective layer on its surface.

In an effort to forcibly peel the volume hologram layer from the application card, the volume hologram layer broken down due to its strong adhesion force to the application card. A hologram image could be observed more clearly than that in Example 6, because the contrast of the hologram image to a background was more increased than that in the case of the colored hologram transfer foil obtained in Example 6.

EXAMPLE 9

First Multilayer Structure Comprising Pet Film/Volume Hologram Recording Material/Releasable Pet Film A coating solution of a hologram-forming material composed of 500 parts by weight of a polymethyl methacrylate resin (with a molecular weight of 200,000), 5 parts by weight of 3,9-diethyl-3'-carboxymethyl-2,2'-thiacarbocyanine iodine salt, 60 parts by weight of diphenyliodonium hexafluoroantimonate, 800 parts by weight of 2,2-bis[4 (acryloxydiethoxy)phenyl]propane and 800 parts by weight of pentaerythritol polyglycidyl ether was gravure coated on a 50 μm thick PET film (Toray Industries, Inc.) to obtain a coating of 10 μm in post-drying thickness. Then, a 50 μm thick PET film subjected to surface release treatment (Tocello Co., Ltd.) was laminated on the coating surface to prepare a first multilayer structure comprising a PET film/hologram-recording material/releasable PET film.

Second Multilayer Structure Comprising Pet Film/Releasable Protective Layer

Hakurinisu UVC-5W (Showa Ink Kogyo Co., Ltd.) was coated on a 50 μm thick PET film (Lumirror T-60, Toray Industries, Inc.) using a gravure coater to obtain a second multilayer structure having a releasable protective film of 1 μm in post-drying thickness of 1 μm.

Third Multilayer Structure Comprising Surface Releasable Pet Film/Uncolored First Heat Seal Layer Sixty (60) parts by weight of an aqueous thermoplastic resin or an ethylene-vinyl acetate copolymer (EC1700, Chuo Rika Kogyo Co., Ltd.) were dissolved in 40 parts by weight of water to obtain a coating a solution. Then, this coating solution was coated on a 50 μm thick releasable PET film (SP-PET, Tocello Co., Ltd.) using a gravure coater to obtain a third multilayer structure having an uncolored first heat seal layer of 2 μm in post-drying thickness.

Fourth Multilayer Structure Comprising Releasable Sheet 5/Second Heat Seal Layer 4"/Colored Layer 4'

Fifty (50) parts by weight of ethylene-vinyl acetate (AD1790-15, Toyo Morton Co., Ltd.) were dissolved in 50 parts by weight of toluene to obtain a coating solution. Then, this coating solution was coated on a 50 μm thick releasable sheet (SP-PET, Tocello Co., Ltd.) using a gravure coater, thereby obtaining a second heat seal layer 4" of 2 μm in post-drying thickness.

Then, a colored layer-forming ink composed of 30 parts by weight of a polyurethane resin (Nipporan, Nippon Polyurethane Co, Ltd.), 3 parts by weight of a black pigment (Carbon Black, Mitsubishi Chemical Industries, Ltd.) and 67 parts by weight of a diluting solvent was coated on the second heat seal layer 4" using a gravure coater, thereby obtaining a fourth multilayer structure including a colored layer 4' having a post-drying thickness of 2 μm.

Then, aluminum was vacuum deposited by evaporation on the second heat seal layer 4" at a thickness of 100 nm, thereby obtaining a fourth multilayer structure having a reflective metal thin film.

A Lippmann type hologram was recorded in the first multilayer structure having a hologram-forming layer, using laser light of 514 nm wavelength, which was then heated at 100° C. for 10 minutes. After the releasable PET film was released from the first multilayer structure with the Lippmann type hologram recorded therein, the second multilayer structure was heat laminated at 80° C. on the releasable protective layer side over the hologram layer in the first multilayer structure, thereby obtaining a multilayer structure comprising a PET film/releasable protective layer/volume hologram layer/PET film.

Using a high pressure mercury-vapor lamp, the volume hologram in this structure was fixed. Then, the PET film was released from the volume hologram layer to laminate the third multilayer structure on the uncolored first heat seal layer side over the volume hologram layer at 100° C., followed by a release of the releasable PET film. Finally, the fourth multilayer structure was heat laminated on the reflective metal thin film 4' side over the uncolored first heat seal layer at 100° C.

In this way, a colored hologram transfer foil comprising a PET film/releasable protective layer/volume hologram layer/uncolored first heat seal layer/deposited layer 4'/second heat seal layer 4"/releasable sheet 5 was obtained.

Dye Migration Testing

In use, the release sheet was peeled from the colored hologram transfer foil obtained in this example. Then, this hologram transfer foil was laminated at 120 to 140° C. on a polyvinyl chloride card for heat transfer thereon of the volume hologram having a releasable protective layer on its surface.

In an effort to forcibly peel the volume hologram layer from the application card, the volume hologram layer broken down because its adhesion force to the application card was as strong as 3,000 gf/inch or greater. A hologram image could be observed more clearly than that in Example 6, because the contrast of the hologram image to a background was more enhanced than that in the case of the colored hologram transfer foil obtained in Example 6. Defects such as a disturbed hologram image or deposited layer cracking due to the provision of the layer deposited by evaporation were not found at all.

What we claim is:

1. A hologram transfer foil comprising a multilayer structure comprising, in order from top to bottom, a substrate, a volume hologram layer including a volume hologram in a cured resin layer and comprising a matrix polymer, a photo-polymerizable compound and a photo-polymerization initiator, a first heat seal layer formed of a solution coating layer having an aqueous thermoplastic resin dissolved in water and a second heat seal layer which are successively stacked, wherein said substrate is releasable from the remainder of the multilayer structure, and wherein in use, said hologram transfer foil is applied on the second heat seal layer side over an application member, and an adhesion force of the volume hologram layer to the application member is larger than a material fracture force for the volume hologram layer or the application member.

2. A hologram transfer foil comprising a multilayer structure comprising, in order from top to bottom, a substrate, a surface protective layer, a volume hologram layer including a volume hologram in a cured resin layer and comprising a matrix polymer, a photopolymerizable compound and a photo-polymerization initiator, a first heat seal layer formed of a solution coating layer having an aqueous thermoplastic resin dissolved in water and a second heat seal layer which are successively stacked, wherein said substrate is releasable from the remainder of the multilayer structure, and wherein in use, said hologram transfer foil is applied on the second heat seal layer side over an application member, and an adhesion force of the volume hologram layer to the application member is larger than a material fracture force for the volume hologram layer or the application member.

3. The hologram transfer foil of claim 1 or 2, wherein heat seal layer is a transparent heat seal layer and the second heat seal layer is a colored heat seal layer.

4. The hologram transfer foil of claim 3, wherein the colored heat seal layer is a multilayer structure comprising a colored layer and a transparent heat seal layer in order from the first heat seal layer.

5. The hologram transfer foil of claim 4, wherein the colored layer is a colored layer-forming ink layer.

6. The hologram transfer foil of claim 5, which further comprises a release sheet laminated on the surface of the second heat seal layer.

7. The hologram transfer foil of claim 4, wherein the colored layer is a layer comprising a metal or a metal oxide.

8. The hologram transfer foil of claim 6, which further comprises a release sheet laminated on the surface of the second heat seal layer.

9. The hologram transfer foil of claim 4, which further comprises a release sheet laminated on the surface of the second heat seal layer.

10. The hologram transfer foil of claim 3, which further comprises a release sheet laminated on the surface of the second heat seal layer.

11. The hologram transfer foil of claim 1 or 2, which further comprises a release sheet laminated on the surface of the second heat seal layer.

* * * * *